United States Patent [19]

Pfost et al.

[11] 4,331,993
[45] May 25, 1982

[54] WEB CLEANING APPARATUS

[75] Inventors: R. Fred Pfost, Los Altos; Chester W. Newell, San Jose, both of Calif.

[73] Assignee: Newell Research Corporation, Saratoga, Calif.

[21] Appl. No.: 162,625

[22] Filed: Jun. 24, 1980

[51] Int. Cl.³ .................. G11B 5/00; A46B 15/00
[52] U.S. Cl. .................................. 360/137; 15/256.5
[58] Field of Search ............ 360/137; 15/DIG. 13, 15/256.5

[56] References Cited

U.S. PATENT DOCUMENTS

| | | | |
|---|---|---|---|
| 3,872,510 | 3/1975 | Childress | 360/137 |
| 4,001,878 | 4/1977 | Seidel et al. | 15/256.5 |
| 4,004,317 | 1/1977 | Beedle | 15/236 A |
| 4,038,919 | 8/1977 | Lotte | 101/120 |
| 4,114,226 | 9/1973 | Warren | 15/236 R |

OTHER PUBLICATIONS

Bullock et al., "Self-Cleaning . . . Media", IBM Tech. Disc. Bull., vol. 18, No. 8, Jan. 1976, pp. 2419-2420.

Primary Examiner—Robert S. Tupper

[57] ABSTRACT

A tape cleaner head that has an arcuate surface around which tape is wrapped. The body of the cleaning head has an opening formed therein, the opening being shaped so as to form first and second knife edges at a point where the arcuate surface is in contact with the tape. The knife edges provide scraping surfaces to the tape regardless of the direction of travel of the tape over the cleaning head to thereby remove foreign particles from the tape surface to prevent signal disturbance and form a cavity to entrap the particles and remove them from the system.

3 Claims, 2 Drawing Figures

WEB CLEANING APPARATUS

The invention relates to the field of cleaning and, more particularly, to means for cleaning the surface of a moving web.

BACKGROUND OF THE INVENTION

In apparatus that employ a moving web, which is transported from one position in the apparatus to another position in the apparatus, it is in many applications desirable to continuously clean the surface of the web of foreign materials. This is particularly true in tape-drive systems such as for magnetic tape recorders, wherein the tape is usually drawn from a supply roll, over a tape guide, over a transducing head, and hence onto a takeup roll. Since the magnetic tape is in repetitive contact with mechanical surfaces, the tape is stressed in such a manner that its oxide coating will shed particles. These small particles adhere to various surfaces, such as the surface of the head or the guiding mechanism. These loose particles may then come in contact with the magnetic tape and are redeposited or accumulate on the recording surface. Successive passages of the tape over a sliding surface in contact with the recording surface of the tape, such as the head, may impact-weld the oxide particles onto the tape-recording surface and/or the sliding contact surface.

In a tape transport system with a peripheral belt drive such as disclosed in U.S. Pat. No. 4,172,569 to Chester W. Newell, the oxide-recording surface faces outward on the tape roll and contacts the belt drive. Any loose particles caught between the belt and the tape will be embossed onto the tape-recording surface.

The buildup of oxide on the tape surface may cause the tape to come out of contact with the head over a large enough area that a signal dropout will occur with respect to information recorded at that area. Particles accumulating on the magnetic transducng head surface may upon impact weld to the head surface causing a buildup of oxide. This oxide buildup will eventually lift the tape away from the head transducing gap, thus reducing the amplitude of the signal transduced from the recorded information because of the tape-to-head separation. Furthermore, the oxide buildup on the head surface will present a rough surface to the tape and accelerate tape wear.

Prior U.S. Pat. Nos. 3,683,445 to Hagadorn, and 3,745,602 to Beistle, disclose tape-cleaning heads which have a body portion with an arcuate surface around which tape is partially wrapped, with an opening formed in the body, a knife edge, or edges being provided in the opening. The knife edges provide a scraping surface to clean the tape as the tape moves toward the knife edge, in either direction.

In Hagadorn the knife blade protrudes slightly out of the cavity so that it presents a cleaning edge to the tape surface in either direction of tape travel. As particles are scraped from the tape they fall into the cavity and are sucked out by means of a vacuum source.

In Beistle a similar structure is employed, the blade in the cavity being movable so that it rocks back and forth as tape direction changes, to thereby present a sharper angle to the tape surface.

Both Hagadorn and Beistle have the disadvantage that the knife edges tend to dull rapidly with time due to tape friction, and the geometries of the cleaning devices. Furthermore, when tape motion stops, particles have built up at the knife edge, and as tape direction reverses, any line of debris at the knife edge will be carried away by the tape. This debris will not be removed by the cavity outer wall, and will be embossed onto the tape surface.

It is, therefore, a primary object of the present invention to provide a tape cleaner that will remove loose oxide particles from a tape surface.

It is a further object of the present invention to provide a tape cleaner that will remove loose oxide particles from magnetic recording tape and deposit the removed particles in a safe location so that they cannot be returned and redeposit themselves on the tape or other parts of the magnetic tape system.

SUMMARY OF THE INVENTION

Briefly, the above objects are accomplished in accordance with the invention by providing a specially contoured tape-cleaning post or head around which the tape is wrapped during transit from a supply roll to a takeup roll in such a manner that the oxide surface is passed over cleaning edges with a very controlled pressure. The shape of the cleaning head is such that spurious particles are removed upon the first pass of tape over the edge before embossing or welding can occur but with a low enough scraping action that no oxide bonding within the coating binder on the tape is removed.

In accordance with an aspect of the invention, the tape cleaning head is made symmetrical with respect to tape direction so that the cleaning activity is identical regardless of the direction of travel of the tape over the cleaning surface.

In accordance with a further aspect of the invention, the cleaning head is provided with a cavity into which scraped-off particles drop and collect, thereby effectively insulating the removed particles from redeposit on other parts of the tape drive system.

In accordance with a still further object of the invention, grooves are provided before and after the cleaning edges to thereby spill entrapped air to thus ensure adequate cleaning activity at all tape speeds and to maintain a high enough pressure against the cleaning surface so that no oxide buildup occurs on the cleaning edges.

The invention has the advantage that its unique shape allows it to be used for the dual purpose of providing a turnaround post or a friction post in a tape guide system in addition to being used as a tape cleaning head.

The invention has the further advantage that it is symmetrical in shape thus providing identical cleaning activity in both the forward and backward direction of tape travel.

The invention has the advantage that when tape is traveling in a direction opposite to the cleaning direction, the tape acts as a strop to the knife edge not engaged in cleaning action, tending to sharpen the edge.

The invention has a still further advantage in that it provides a cavity through which particles that have been scraped off are pulled back into the cavity, and do not build up on the edges of the cleaning head as for example might occur as tape changes direction. The loose particles can be removed by means of a vacuum or by providing an opening outside of a tape cartridge in those cases where the invention is embodied in an enclosed tape cartridge.

BRIEF DESCRIPTION OF THE DRAWINGS

The foregoing and other objects, features, and advantages of the invention will be apparent from the following detailed description of preferred embodiments of the invention as illustrated in the accompanying drawings wherein.

DESCRIPTION

Figure 1:
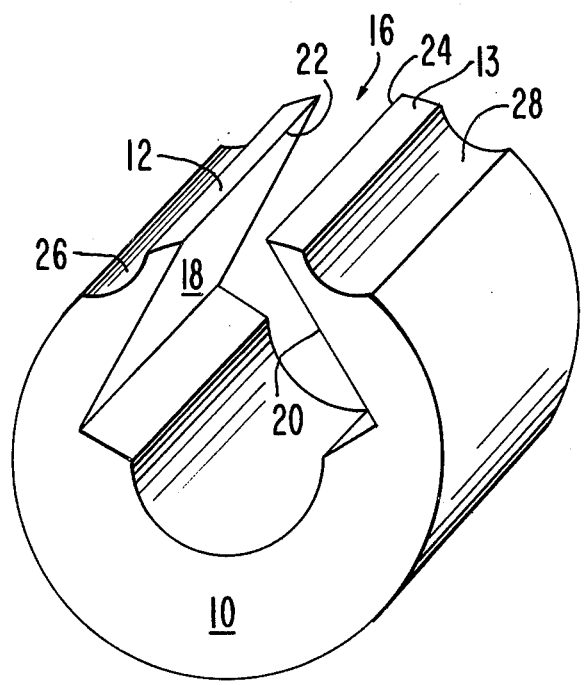
FIG. 1 is a perspective view of a web-cleaning device.

Referring now to FIG. 1, a tape-cleaning post is shown which is comprised of a body portion (10) having an arcuate surface adapted to contact a web, such as a magnetic recording tape (14), wrapped partially around the post. An opening (16) is formed in the body (10). The opening is located between two locations where the tape contacts the arcuate surface of the post when the tape is trained around the post.

Figure 2:
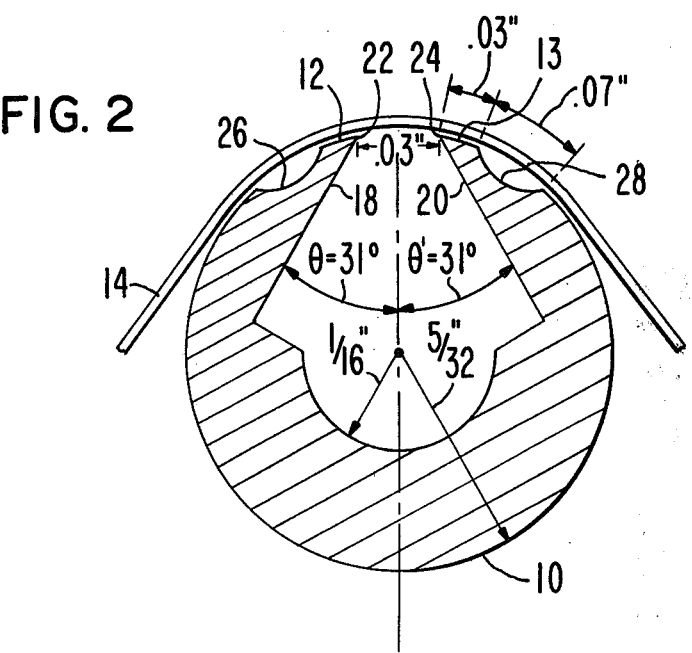
FIG. 2 is a cross-sectional view of the web cleaning device shown in FIG. 1.

As shown more clearly in FIG. 2, the opening (16) is formed by machining away or forming the material at an angle $\Theta$ to a radial plane that passes through the midpoint between the surface areas contacted by the tape (14). At one side of the opening the body forms a wall (18) that intersects the arcuate surface (12) to form a knife edge (22) where the arcuate surface is in contact with the magnetic tape.

A similar wall (20) is formed by machining away or forming the body portion at a similar angle $\Theta'$ to form another knife edge (24) between the wall (20) and the arcuate surface (13). The two knife edges (22 and 24) form identical mirror images of each other and thus provide symmetrical cleaning surfaces to clean the tape in both the forward and the backward direction of tape travel. As can be seen from FIG. 2, the knife edge (22) provides a scraping surface to clean the magnetic recording tape when the tape is drawn from right to left in a direction toward the knife edge (22).

The angle $\Theta$ is chosen to provide just enough cleaning activity to remove the spurious particles without removing virgin oxide. An angle of 31° was found to be optimum for the configuration shown in FIGS. 1 and 2. At the knife edges (22 and 24), the included angle between the adjacent wall (18 and 20) and a chord between the knife edges would be 90° plus $\theta$ or $\theta'$. Using an angle of 31° for $\theta$ or $\theta'$, the included angle would be 121°.

It should be understood that with the configuration shown, the angle between the wall and the arcuate surface remains substantially the same as the arcuate surface wears due to tape friction. Thus the knife edges do not become dull in a short period of time. Further, the tape actually tends to sharpen the blades by a stropping effect.

Grooves (26, 28) may be cut into the head surface in order to spill entrapped air, to ensure adequate cleaning activity at all tape speeds, and to maintain a high enough unit pressure so that no oxide buildup occurs on the cleaning edges (22, 24).

Ideally, two cleaning posts would be employed, one on either side of the magnetic recording head, located between the takeup hub and the head and the supply hub and the head in order to ensure that loose oxide particles are removed prior to tape being passed over any sliding surface or wound upon either of the hubs, in the forward or backward direction.

In copending patent application Ser. No. 162,598 entitled "Apparatus for Reducing Tape Tension Variations in a Peripheral Belt Drive Tape Transport System" of William Seaman and assigned to the assignee of this appication, there is described a tape cartridge wherein tape is drawn from a supply hub over a first post located so as to be in constant contact with the tape as it spools off of the supply roll. The tape is then drawn past a first turnaround idler, past a transducing head, over a second turnaround idler, over a second post, and then onto the takeup hub. The first and second fixed posts are introduced into this system to produce a drag on the tape to thus correct for differences in tape tension due to the particular characteristics of the cartridge as more fully described in the above-identified patent application. The fixed friction posts are located so as to be in constant contact with the tape as it spools off of the appropriate roll, the tape describing a minimum angle of wraparound each of the posts when a minimum amount of tape is wound upon the hub, and a maximum angle of wrap around the post when a maximum amount of tape is wound upon the hub. The tape cleaning post described in the present application can be substituted for each of the first and second friction guideposts in the Seaman application and thus perform the dual purpose of cleaning and providing a friction drag on the tape. When so utilized, the minimum angle of wrap around the post can be chosen to provide sufficient cleaning activity, as the particular contour of the cleaning head is such that a maximum angle of wrap will not increase the angle at which the knife edges (22, 24) contact the tape. Thus, no damage to the tape will occur if the wrap angle varies, as is the case in the cartridge described in the Seaman application.

While the invention has been particularly shown and described with reference to a preferred embodiment thereof, it will be understood by those skilled in the art that various changes in form and details may be made therein without departing from the spirit and scope of the invention.

We claim:

1. An apparatus for cleaning the recording surface of a magnetic tape and guiding the tape as it travels either forward or backward through an arcuate path about the apparatus comprising:
   a post body having a peripheral opening therein;
   a pair of walls that diverge inwardly of the post body to define opposite sides of the opening;
   a pair of arcuate surfaces on the periphery of the post body, one arcuate surface located adjacent one side of the opening and the other arcuate surface located adjacent the other side of the opening, for supporting the tape; and
   a pair of knife edges, one edge at one side of the opening and the other edge at the other side of the opening, formed by the intersection of a wall with an adjacent arcuate surface for cleaning the tape in forward and backward directions of tape travel;
   said post body being located with the peripheral opening facing the recording surface of the magnetic tape and centered between the arcuate surfaces contacted by the tape;
   whereby tape tension forces the tape against the knife edges and the recording surface is scraped regardless of reversal of direction of tape travel.

2. The apparatus in accordance with claim 1 wherein at each knife edge the included angle between an adjacent wall and a chord between opposed knife edges is 121°.

3. The apparatus in accordance with claim 1 wherein said post body has a pair of grooves on its periphery at opposite sides of the arcuate surfaces from the opening to spill entrapped air as the tape is drawn over the arcuate surfaces, thereby ensuring adequate cleaning activity at all tape speeds and maintaining a high enough unit pressure to prevent oxide buildup on the knife edges.

* * * * *